United States Patent Office 3,585,141
Patented June 15, 1971

3,585,141

STABILIZATION OF CHROMIUM DIOXIDE BY MONOMERIC CYCLIC AMINES

Henry Gilbert Ingersoll, Hockessin, Del., assignor to E. I. du Pont de Nemours and Company, Wilmington, Del.

No Drawing. Filed May 5, 1969, Ser. No. 821,997
Int. Cl. H01f *1/28*
U.S. Cl. 252—62.54 11 Claims

ABSTRACT OF THE DISCLOSURE

Monomeric aromatic heterocyclic tertiary amines and the alkyl, aryl, aroyl, carboxy acid, carboxy ester, or cyano derivatives thereof, said amines and derivatives characterized by a molecular weight of at least 150 or a melting point of at least 50° C., are admixed in stabilizing amounts with ferromagnetic $CrO_2$ particles and incorporated with a polymer binder to retard loss of residual intrinsic flux density of magnetic recording members, e.g., tapes, discs, and cylinders having a layer of the ferromagnetic $CrO_2$ compositions.

BACKGROUND OF THE INVENTION

Field of the invention

This invention relates to magnetic recording members, e.g., magnetic tapes, and particularly to recording members containing ferromagnetic chromium dioxide as the magnetic material and to compositions from which the members or elements are made.

Description of the prior art

The preparation of ferromagnetic chromium dioxide and the use of this material to make magnetic recording members has been described in a number of patents, among which may be mentioned U.S. Pats. 2,885,365; 2,923,683; 2,923,684; 2,923,685; 2,956,955; 3,080,319; 3,117,093 and 3,278,263. Chromium dioxide prepared as described in these patents has excellent ferromagnetic properties. Magnetic recording members in which anisotropic chromium dioxide particles are highly oriented are especially suitable for storage of information.

The usefulness of any information storage system depends, of course, on its reliability, that is, on the certainty that all of the information stored in the system can be retrieved on demand, even after long periods of storage. Therefore, in a magnetic storage system, it is required that the magnetic characteristics of the recording member remain essentially unchanged over a protracted time under conventional storage conditions.

Ferromagnetic chromium dioxide in the form of dry powder is stable, can be stored for many years with no detectable change, and is unaffected by prolonged heating in dry air at temperatures below 300° C. However, it reacts slowly with water to form nonmagnetic materials, with the result that some of its desirable properties are diminished with age when it is stored in moist conditions such as are frequently present, for example, in magnetic tapes and other magnetic recording members. Moreover, the rate of degradation may be accelerated by certain organic materials present in the binder systems commonly used to provide mechanical strength in recording members.

For the highly desirable ferromagnetic properties of chromium dioxide to be used to full advantage in magnetic information storage systems having a high degree of long-term reliability, there is an apparent need for stabilizers that will permit the preparation of magnetic recording members that will not undergo loss of magnetic characteristics even when stored for long periods of time under extreme conditions of temperature and humidity.

SUMMARY OF THE INVENTION

This invention relates to a ferromagnetic chromium dioxide composition and layer comprising:

(a) fine ferromagnetic chromium dioxide particles,
(b) a macromolecular organic polymer binder, and
(c) a stabilizing amount of a monomeric cyclic amine having the formula $R_x^1R_y^2$, wherein $R^1$ is an aromatic heterocyclic tertiary amine radical attached through a cyclic carbon atom thereof to $R^2$ which is hydrogen, alkyl, aryl, aroyl, carboxy acid, carboxy ester, or a cyano radical, and $x$ and $y$ are integers with a value of at least 1, said monomeric compound being further characterized by a molecular weight of at least 150 or a melting point of at least 50° C.

Suitable alkyl radicals have 1–18 or more carbon atoms and include methyl, ethyl, hexyl, dodecyl, tridecyl, and octadecyl; suitable aryl radicals include phenyl and naphthyl; suitable aroyl radicals include benzoyl and napthoyl; and suitable carboxy ester radicals are carboxy alkyl esters where the alkyls are the same as recited above. The invention also relates to a process for making the composition by admixing ingredients (a) and (c) and a solvent for ingredient (c) and then admixing ingredient (b). The magnetic recording elements of this invention, as compared with prior elements, have significantly enhanced stability in the ferromagnetic properties upon aging in hot, moist conditions; and are useful for various purposes, e.g., as magnetic recording members, e.g., discs, cylinders, audio, video, instrumentation and computer tapes, for control equipment and magnetic cores.

DESCRIPTION OF THE PREFERRED EMBODIMENTS

In making magnetic recording members according to this invention, any preformed ferromagnetic chromium dioxide may be used, but it is desirable to use a form having high coercivity and high remanent magnetization. Preferably, the chromium dioxide is in single-crystal acicular form that possesses magnetocrystalline anisotropy with a unique axis of easy magnetization which coincides more or less with the acicular axis. The preparation of suitable forms of ferromagnetic chromium dioxide is described in U.S. Pats. 2,885,365; 2,923,683; 2,923,684; 2,956,955; 3,034,988 and 3,278,263. Also suitable are chromium dioxides prepared as described in these patents then subjected to after-treatments such as the upgrading described in assignee's copending application of Bottjer and Cox, S.N. 705,029, filed Feb. 13, 1968, now U.S. Pat. 3,529,930, Sept. 22, 1970, and the stabilizing treatment described in assignee's copending application of Bottjer and Ingersoll S.N. 732,109, filed May 27, 1968, now abandoned, but first refiled as S.N. 822,683, May 7, 1969, U.S. Pat. 3,512,930, May 19, 1970. Recording members can contain 1% to 98% and preferably 65%–75% by weight of fine, acicular ferromagnetic chromium dioxide particles having the sizes and physical properties defined in the above-listed patents.

As the organic polymeric binder, there may be employed any of the commercially available polymers commonly used in preparing magnetic tapes and other magnetic recording members. Alternatively, the binder can be a polymer prepared by addition polymerization or condensation polymerization from commercially available monomers. Representative macromolecular, film-forming, organic polymer binding agents are polyurethanes, epoxides, vinyl polymers, polyacrylic or polymethacrylic acids or esters thereof, polybutadiene, polycarbonates, cellulose esters, and mixtures of the polymers or copolymers of two or more of the vinyl or acrylic monomers. Those skilled in the art can readily select from the large number of available polymers those that will give the desired combination of such properties as strength, elasticity, surface uniformity, smoothness, and the like. One preferred material is a soluble preformed polyester-polyurethane elastomer resin based on diphenylmethane diisocyanate, adipic acid, and an alkanediol having 2–4 carbon atoms. If desired, a binder of this kind may be hardened with such agents as polyfunctional polyisocyanates, e.g., 2,4-toluene diisocyanate/trimethylol propane (3/1), 4,4'-methylene - bis - (cyclohexylisocyanate), and the like. Other preferred binders are the commercially available copolymers of vinylidene chloride with acrylonitrile, and these may also be usefully combined with the polyester-polyurethane elastomer resins previously described. The binder will preferably comprise 25% to 35% by weight of the dry composition.

The composition may include small quantities of other conventional ingredients, e.g., surface active agents, reticular carbon, lubricants, etc., including those disclosed in U.S. Pats. 2,418,479, 2,654,681, 2,804,401, 3,009,847, 3,274,111, and 3,320,090.

With the ferromagnetic chromium dioxide of such compositions, there is present, according to this invention, a stabilizing amount, i.e., from less than 1% to 10% or more by weight of the total dry weight of the chromium dioxide in the composition, of the monomeric compound $R_x^1 R_y^2$ as defined above, having a molecular weight of at least 150 or a melting point of at least 50° C., wherein $R^1$ is an aromatic heterocyclic tertiary amine radical, e.g., pyridyl or quinolyl, and $x$ and $y$ are integers with a value of at least 1. $R^2$ may be any of the following, for which illustrative compounds are given:

| | |
|---|---|
| Hydrogen | Phenanthridine; 1,10-phenanthroline. |
| Alkyl | 4-n-tridecylpyridine. |
| Aryl | 4,7-diphenyl-1,10-phenanthroline. |
| Aroyl | 3-benzoyl pyridine. |
| Carboxy acid | 6-quinoline carboxylic acid. |
| Carboxy ester | ethyl isonicotinate. |
| Cyano | 4-cyanopyridine. |

To be useful in imparting long-term stability of magnetic properties to a magnetic recording member, it is, of course, essential that the compound employed as stabilizer be retained in the recording member for the duration of its useful life. The stabilizing compound must be sufficiently non-volatile that it is not driven out of the coating composition at the temperatures employed in the course of manufacture of magnetic recording members, and that it is not volatilized from the completed recording member at the temperatures encountered in use and in storage. It has been found that this requirement is met by those compounds of the formula $R_x^1R_y^2$, as already defined, which are further characterized by having a molecular weight (M.W.) of at least 150 or a melting point (M.P.) of at least 50° C. Compounds that fall within the $R_x^1R_y^2$ description but that do not satisfy either the molecular weight requirement or the melting point requirement may have satisfactory stabilizing activity from a chemical standpoint but cannot be retained in the magnetic composition to an extent that allows their stabilizing activity to be practically effective. Thus, pyridine (M.W. 79, M.P. −42° C.) and quinoline (M.W. 129, M.P. −15° C.), which meet neither the molecular weight nor melting point requirement, have been found to be impractical for use as stabilizers according to this invention. On the other hand, as will be seen in the examples hereinafter, effective stabilization can be achieved (a) with low-melting materials provided they have adequate molecular weight, e.g., ethyl isonicotinate (M.W. 151, M.P. <25° C.) and 3-benzoyl pyridine (M.W. 183, M.P. 36–40° C.), and (b) with low-molecular-weight materials that have a sufficiently high melting point, e.g., 4 - cyanopyridine (M.W. 104, M.P. 78–80° C.).

For convenience in expression, the terms "pyridine compound(s)" and "pyridine derivatives(s)" may be used hereinafter to refer to the stabilizers useful in the practice of this invention, but it will be understood that these terms refer to the monomeric aromatic heterocylic tertiary amines and their derivatives (i.e., compounds that have in their structure at least one

ring) of the formula $R_x^1R_y^2$ as described and defined hereinbefore, whether or not such compounds are actually made or derived from pyridine itself as a starting material.

It has been found that many of the monomeric pyridine derivatives useful as stabilizers in the present invention can serve effectively also as dispersing agents for the chromium dioxide in the binder systems. When these compounds are used, the dispersing agents which would otherwise commonly be employed can be omitted from the compositions. This is an additional advantage of the present invention, since some of the conventional dispersing agents have been shown to accelerate the degradation of magnetic properties of chromium dioxide in the presence of moisture.

The weights, parts and percentages of the various components are discussed in terms of the final dry magnetic composition, i.e., binder, chromium dioxide, stabilizer, lubricant, plus other ingredients, but the compositions are made from solutions or dispersions of the organic components, where it is not feasible to use a given component, e.g., the polymer binder, in its undissolved form. The solvent content of a given composition is, of course, evaporated in the course of putting the composition in the form of a useful magnetic recording member. The choice of solvent is not critical and is governed by the solubility characteristics of the binder or binders (and other materials) selected for the composition. Representative solvents for the polymer binders and pyridine compounds are tetrahydrofuran, acetone, and methyl ethyl and methyl isobutyl ketones and cyclohexanone. Mixtures of two or more of such solvents can be used.

In preparing magnetic recording compositions according to this invention, the procedures described below may be employed. In a typical procedure, the preformed chromium dioxide, the pyridine derivative stabilizer and a quantity of solvent are placed in a container together with an amount of Ottawa sand equal to 2–3 times the weight of the chromium dioxide. The container is closed and the ingredients are slurry-milled, for example, with the aid of a paint conditioner or shaker oscillating at about 700–1000 cycles per minute. There is then added a solution of the polymeric binder component(s) in an amount sufficient to give the desired proportion of binder in the final dry composition. After further milling or shaking, there may be additions of such other components as lubricants, hardening agents, and the like, and it will frequently be desirable that the additions be made as solutions of these various ingredients. When sufficient final mixing and milling have been carried out, the dispersion may be filtered to remove the sand, deaerated, and adjusted to desired final viscosity by addition of solvent.

The dispersions prepared in this way may be cast by conventional techniques to form self-supporting films which may serve as integral magnetic recording members. Alternatively, they may be coated, by means of a doctor knift adjusted to give a coating of the desired thickness, on any suitable base material to form supported magnetic recording members. Among the base materials that may be used are non-magnetic metal sheets, plates, discs, drums, and the like, and previously prepared films, sheets, or tapes made from any of a number of organic polymeric materials having suitable characteristics of strength, dimensional stability, surface friction, and the like, all as well understood by those skilled in this art, e.g., films of cellulose acetate or of polyethylene terephthalate. In either case, i.e., supported or non-supported, the films or coatings are passed, before fully set, between opposing magnets having an orienting field strength sufficient to align the magnetic particles in parallel fashion. The films or coatings containing the oriented chromium dioxide particles are then allowed to dry at room or elevated temperature, and, when they contain cross-linking agents, to cure at temperatures and for periods of time sufficient to produce cross-linking of the polymers in the compositions. The resulting coatings or films are then aged under various conditions for testing their stability. When they are to be tested for magnetic properties, they may first be calendered at elevated temperature and pressure, the exact temperature and pressure varying with the particular composition of the coating and the base (if any). If the members are to be aged before testing, they will, of course, be stored for the desired length of time in an environment where the desired conditions of temperatures and humidity are maintained.

The invention will be further explained by the following examples, which are intended to be illustrative and not limiting. The chromium dioxide used in these examples was prepared according to Cox U.S. Pat. 3,278,263 and was further made ready by grinding with a mortar and pestle to break up agglomerates and insure uniform fine particle size. The more important magnetic characteristics are given for each sample of chromium dioxide employed. Intrinsic coercive force, $H_{ci}$, is defined in Special Technical Publication No. 85 of the American Society for Testing Materials entitled "Symposium on Magnetic Testing" (1948), pp. 191–198. The values given in the examples herein were determined on a DC ballistic-type apparatus which is a modified form of the apparatus described by Davis and Hartenheim in Review of Scientific Instruments, 7, 147 (1936). Saturation per gram, $\sigma_s$, and retentivity or remanence per gram, $\sigma_r$, are defined on pp. 5–8 of Bozorth's "Ferromagnetism," D. Van Nostrand Co., New York (1951). The values given herein for these properties were determined in a field of 4,400 oersteds on apparatus similar to that described by T. R. Bardell on pp. 226–228 of "Magnetic Materials in the Electrical Industry," Philosophical Library, New York (1955).

The stability of the magnetic characteristics of a magnetic recording member can be determined by measurement of residual intrinsic flux density (or remanent flux), $\phi_r$, of a 0.5-inch-wide sample of the member when fresh and again after aging. This property is measured on a DC ballistic-type magnetometer which is a modified form of the apparatus described by Davis and Hartenheim in Review of Scientific Instruments, 7, 147 (1936). Changes in $\phi_r$ are expressed as the time in days required for a loss of 10% of the initial $\phi_r$. This loss in residual intrinsic flux density is termed the $t_{10}$ value, and is the value reported to characterize the stability of the member being tested. Since the rate of degradation of magnetic properties is generally slow at normal room conditions.

it is usually desirable to accelerate the test by aging the members at elevated temperature and humidity, e.g., 65° C. and 50% RH. Experience has shown that one day of aging under these conditions produces degradation equivalent to that found after about one year of aging under normal storage conditions. In the following examples, stability test data are for samples subjected to accelerated aging conditions; specifically, the $t_{10}$ value for a given sample shows that that sample lost 10% of its initial residual intrinsic flux density ($\Delta\phi_r = -10\%$) after storage for the indicated number of days at 65° C., 50% RH.

EXAMPLES I–IV

These examples illustrate the making of magnetic recording compositions including stabilizers of this invention and the preparation of magnetic recording members from the compositions.

For each composition, in a glass bottle with a capacity of about 60 ml. were placed (a) 11.8 g. of tetrahydrofuran; (b) 4 g. of chromium dioxide having an intrinsic coercive force ($H_{ci}$) of 382 oersteds, a saturation ($\sigma_s$) of 82.1 e.m.u. per gram, and a retentivity ($\sigma_r$) of 37.4 e.m.u. per gram; (c) 0.16 g. of a monomeric pyridine derivative, further identified in Table 1; and (d) 10 ml. of 20–30 mesh washed Ottawa sand. The bottle was capped and the ingredients were slurry-milled for 45 minutes by shaking the bottle in a commercial paint conditioning machine operating at about 720 cycles per minute. To the contents of the jar were then added (e) 0.87 g. dry basis (5.8 g. of a 15% by weight solution in tetrahydrofuran) of a commercially available polyester-polyurethane resin from 1,4-butanediol, adipic acid, and diphenyl methane diisocyanate; (f) 0.84 g. dry basis (2.8 g. of a 30% solution in acetone) of a commercially available vinylidene chloride/acrylonitrile (80/20) copolymer; and (g) 10 ml. of 20–30 mesh washed Ottawa sand. The bottle was again capped and shaken for 30 minutes on the paint conditioning shaker as before. The mixture was then filtered through a cloth pad supported on a metal screen having a 2-micron filter rating.

For comparative purposes, a prior art composition identified in Table 1 as Control A was made up from the same $CrO_2$, solvent and binder ingredients and by the same procedures, but without a monomeric pyridine compound as stabilizer.

Each of the dispersions thus prepared was spread by means of a doctor knife set at a clearange of 0.003-inch on a 0.0015-inch-thick commercial polyethylene terephthalate film base. While still wet, the film was passed between opposing magnets having an orienting magnetic field of about 900 gauss to align the chromium dioxide particles. The oriented layer was then dried overnight at room temperature. The dry layer was calendered with one pass between a cotton-filled roll and a polished chrome-plated steel roll having its surface at a temperature of about 105° C. at a pressure of 1000–2000 pounds per linear inch, with the coated side of the film in contact with the polished roll. The composition of the dry magnetic coating, exclusive of the polyethylene terephthalate supporting film, was approximately 70% chromium dioxide and approximately 30% total binder. In Examples I–IV, the monomeric pyridine additives were present to the extent of 4% by weight of the chromium dioxide or 2.8% by weight of the total dry coating. Each of the magnetic recording members thus prepared exhibited good general magnetic properties characteristic of coatings containing ferromagnetic chromium dioxide of the patents listed above. Residual intrinsic flux density, $\phi_r$, was determined initially and after aging at 65° C., 50% RH. The $t_{10}$ values in Table 1 illustrate the advantage of including a monomeric pyridine derivative according to this invention.

TABLE 1

| Example | Stabilizer | $t_{10}$ (days) |
|---|---|---|
| Control A | None | 3.1 |
| I | 4-cyanopyridine, 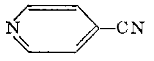 (M.W. 104, M.P. 78-80° C.). | 4.0 |
| II | 6-quinoline carboxylic acid, 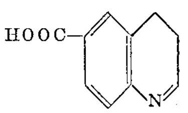 (M.W. 173, M.P. 290° C.). | 5.2 |
| III | 4,4'-dipyridyl salt of the acid phosphate of a mixture of even-numbered long-chain ($C_8$–$C_{18}$) alcohols (M.W. 760±20). | 5.7 |
| IV | Pyridine salt of the acid phosphate of a mixture of even-numbered long-chain ($C_8$–$C_{18}$) alcohols (M.W. 381±10). | 4.8 |

These examples, whose compositions and characteristics are given in Table 2, were made and tested by the general procedures of Example I. Examples V and VI contained 4-benzoyl pyridine,

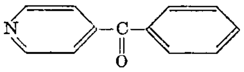

(M.W. 183, M.P. 73° C.), and illustrate the present invention. The coating of Example V showed substantially better stability than the prior art coating of Control A, which employed the same binder ingredients. Control B shows improved stability with a different prior art binder, and Example VI shows still further improvement by the additive effect of incorporating a stabilizer according to the present invention. Parts and percents in Table 2 are by weight of the final dry coating, exclusive of supporting film. It will be understood that the binder ingredients were actually used in the form of solutions as described in Example I.

TABLE 2

| Composition and properties | Example, control V | B | VI |
|---|---|---|---|
| 1. Parts by weight: | | | |
| (a) Chromium dioxide [1] | 12 | 12 | 12 |
| (a) Polyester-polyurethane resin | 2.2 | 1.9 | 1.9 |
| (c) Vinylide chloride/acrylonitrile polymer | 3.1 | 2.8 | 2.8 |
| (d) Poly(n-butyl methacrylate) [2] | None | 0.48 | 0.48 |
| (e) 4-benzoyl pyridine | 0.48 | None | 0.48 |
| 2. Percent by weight, approximate: | | | |
| (a) $CrO_2$ | 68 | 70 | 68 |
| (b) Total binder | 32 | 30 | 32 |
| (c) Poly(n-butyl methacrylate) | 0 | 2.8 | 2.7 |
| (d) 4-benzoyl pyridine | 2.7 | 0 | 2.7 |
| 3. Stability, $t_{10}$ | 6.5 | 7 | 13 |

[1] $H_{ci}$=400-430 oersteds; $\sigma_s$=84±0.7 e.m.u./g.; $\sigma_r$=38±1.0 e.m.u./g.
[2] Viscosity=0.53 for solution of 0.25 g. in 50 ml. $CHCl_3$ measured at 20° C. with a No. 50 Cannon-Fenske viscometer.

EXAMPLES VII–XII

These examples were made and tested by the general procedures of Example I. Control C was a control; Examples VII–XII incorporated stabilizing additives according to this invention. The properties of the chromium dioxide employed were $H_{ci}$=438 oersteds, $\sigma_s$=81.9 e.m.u./g., and $\sigma_r$=37.5 e.m.u./g. The binder ingredients were those identified in the preceding examples. On the basis of the dry weight of the final coating, exclusive of supporting film, the general formulation was approximately 68% $CrO_2$ and approximately 32% total binder, as follows:

| | Parts |
|---|---|
| Chromium dioxide | 12 |
| Polyester-polyurethane resin | 1.9–2.1 |
| Vinylidene chloride/acrylonitrile copolymer | 2.8–3.2 |
| Poly(n-butyl methacrylate) | 0.48 |

In Examples VII–XII, the stabilizing additives identified in Table 3 were incorporated to the extent of 0.48 part by weight (4% by weight of the $CrO_2$) and comprised approximately 2.7% by weight of the total dry coating. The stability results in Table 3 show the advantage of including the monomeric pyridine derivatives according to this invention.

TABLE 3

| Example | Stabilizer | $t_{10}$ (days) |
|---|---|---|
| Control C | None | 0.6 |
| VII | Ethyl isonicotinate, 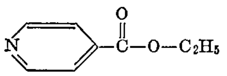 (M.W. 151, M.P. <25° C.) | 2.4 |
| VIII | 3-benzoyl pyridine, 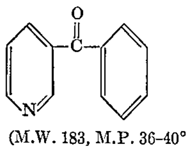 (M.W. 183, M.P. 36-40° C.) | 4.5 |
| IX | Isonicotinic acid, 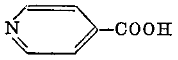 (M.W. 123, M.P. 317° C.) | 2.9 |
| X | 3,4-pyridine dicarboxylic acid, 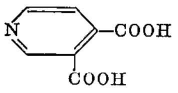 (M.W. 167, M.P. 260° C.) | 2.5 |

TABLE 3—Continued

| Example | Stabilizer | $t_{10}$ (days) |
|---|---|---|
| XI | Phenanthridine, 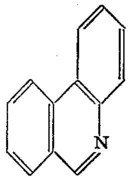 (M.W. 179, M.P. 109° C.) | 6.5 |
| XII | 1,10-phenanthroline, 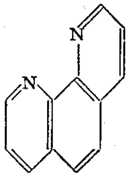 (M.W. 180, M.P. 117° C.) | 6.5 |

EXAMPLES XIII–XV

These examples were made and tested according to the general procedures of Example I and, except as noted, used the ingredients identified in the preceding examples. The approximate composition of the dry coatings, exclusive of supporting film, was 72% chromium dioxide and 28% total binder. On a dry basis, the formulation of the coatings was:

| | Parts |
|---|---|
| Chromium dioxide | 12 |
| $H_{ci}$=406 oersteds | |
| $\sigma_s$=79.6 e.m.u./g. | |
| $\sigma_r$=36.5 e.m.u./g. | |
| Polyester-polyurethane resin | 1.9 |
| Vinylidene chloride/acrylonitrile copolymer | 1.9 |
| 2,4-toluene diisocyanate/trimethylolpropane (3/1) | 0.3 |
| Stearamide lubricant | 0.04 |
| Additive | 0.48 |

The additive in Control D was a commercially available soya lecithin wetting agent, representative of the prior art. The additives in Examples XIII–XV were monomeric pyridine derivatives according to this invention, as indicated in Table 4. In all cases the additive amounted to 4% by weight of the $CrO_2$ and constituted 2.9% by weight of the total dry coating. The stability data in Table 4 show the superiority of the magnetic recording members of the present invention.

TABLE 4

| Example | Additive | $t_{10}$ (days) |
|---|---|---|
| Control D | Soya lecithin wetting agent (prior art) | 2.2 |
| XIII | 4-n-tridecylpyridine, 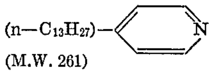 (M.W. 261) | 2.8 |
| XIV | n-Octadecyl nicotinate, 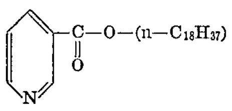 (M.W. 375, M.P. 52° C.) | 5.2 |

TABLE 4—Continued

| Example | Additive | $t_{10}$ (days) |
|---|---|---|
| XV | 4,7-diphenyl-1,10-phenanthroline, 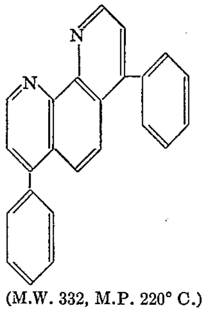 (M.W. 332, M.P. 220° C.) | 6.5 |

EXAMPLES XVI–XVIII

The examples identified in Table 5 were made and tested by the general procedures of Example I. The binder ingredients were those described in previous examples. Control E was a control representative of the prior art; Examples XVI–XVIII illustrate the present invention. The approximate composition by weight of the dry coatings, exclusive of supporting film, was 65.5–67.5% $CrO_2$ and 32.5–34.5% total binder, as follows:

| | Parts |
|---|---|
| $CrO_2$ of Examples XIII–XV | 12 |
| Polyester-polyurethane resin | 2.1 |
| Vinylidene chloride/acrylonitrile copolymer | 3.2 |
| Poly(n-butyl methacrylate) | 0.48 |

In Examples XVI–XVIII, the stabilizing additive comprised 0.48 part by weight (4% on the weight of the $CrO_2$) and constituted approximately 2.6% of the total weight of the dry coating. Stability data in Table 5 show the advantage of the present invention.

TABLE 5

| Example: | Stabilizer | $t_{10}$ (days) |
|---|---|---|
| Control E | None | 5.5 |
| XVI | n-Dodecyl nicotinate, 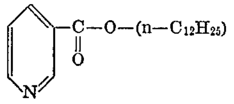 (M.W. 291) | 8.8 |
| XVII | n-Octadecyl nicotinate | 8.0 |
| XVIII | 4,7-diphenyl-1,10-phenanthroline | 6.7 |

From the foregoing examples it will be seen that magnetic recording members containing pyridine derivatives as stabilizers according to this invention have significantly better stability of their magnetic properties as compared with prior art members that do not contain the stabilizers of this invention. Magnetic recording members made as described herein are of high quality and exceptional stability and are suitable for any of the uses where magnetic recording is employed, e.g., audio and television recording, instrumentation and computer applications, and various types of control equipment. The improved stability characteristic of the magnetic recording members of this invention makes them particularly useful in applications where the recording member is to be stored for long periods of time under conditions of high temperature and high humidity.

The embodiments of the invention in which an exclusive property or privilege is claimed are defined as follows:

1. A magnetic recording composition comprising:
   (a) fine, acicular, ferromagnetic chromium dioxide particles,
   (b) a macromolecular organic polymer binder for said particles, and
   (c) a stabilizing amount of a monomeric cyclic amine having the formula $R_x^1R_y^2$, wherein $R^1$ is an aromatic heterocyclic tertiary amine radical attached through a cyclic carbon atom thereof to $R^2$ which is a member selected from the group consisting of hydrogen, alkyl, aryl, aroyl, carboxy acid, carboxy ester and cyano radicals, and *x* and *y* are integers with a value of at least 1, said monomeric compound being further characterized by a molecular weight of at least 150 or a melting point of at least 50° C.

2. A composition according to claim 1, wherein said cyclic amine is 4-benzoyl pyridine.

3. A composition according to claim 1, wherein said cyclic amine is 6-quinoline carboxylic acid.

4. A composition according to claim 1, wherein said cyclic amine is 1,10-phenanthroline.

5. A composition according to claim 1, wherein the amount of cyclic amine is 1%–10% by weight of the dry weight of the chromium dioxide.

6. A composition according to claim 1 in the form of a layer.

7. A composition according to claim 1 in the form of a layer and wherein said cyclic amine is 4-cyano-pyridine.

8. A composition according to claim 1 in the form of a layer and wherein said cyclic amine is 6-quinoline carboxylic acid.

9. A composition according to claim 1 in the form of a layer and wherein said cyclic amine is n-octadecyl nicotinate.

10. A magnetic recording element comprising a support bearing a layer as defined in claim 5.

11. A process of making a magnetic recording composition by admixing fine, acicular ferromagnetic chromium dioxide particles and a macromolecular organic polymer binder, characterized in that there is incorporated with the particles and binder a stabilizing amount of a monomeric cyclic amine having the formula $R_x^1R_y^2$, wherein $R^1$ is an aromatic heterocyclic tertiary amine radical attached through a cyclic carbon atom thereof to $R^2$ which is a member selected from the group consisting of hydrogen, alkyl, aryl, aroyl, carboxy acid, carboxy ester and cyano radicals, and *x* and *y* are integers with a value of at least 1, said monomeric compound being further characterized by a molecular weight of at least 150 or a melting point of at least 50° C.

References Cited

UNITED STATES PATENTS

| | | | |
|---|---|---|---|
| 3,080,319 | 3/1963 | Arrington | 252—62.54 |
| 3,471,415 | 10/1969 | Friedman et al. | 260—23.7 |
| 3,512,930 | 5/1970 | Bottser et al. | 23—145 |

TOBIAS E. LEVOW, Primary Examiner

A. P. DEMERS, Assistant Examiner

U.S. Cl. X.R.

117—234, 235; 252—62.51, 62.53